Nov. 8, 1960 A. G. BUTLER 2,959,180
DISHWASHER
Filed May 17, 1957 2 Sheets-Sheet 1
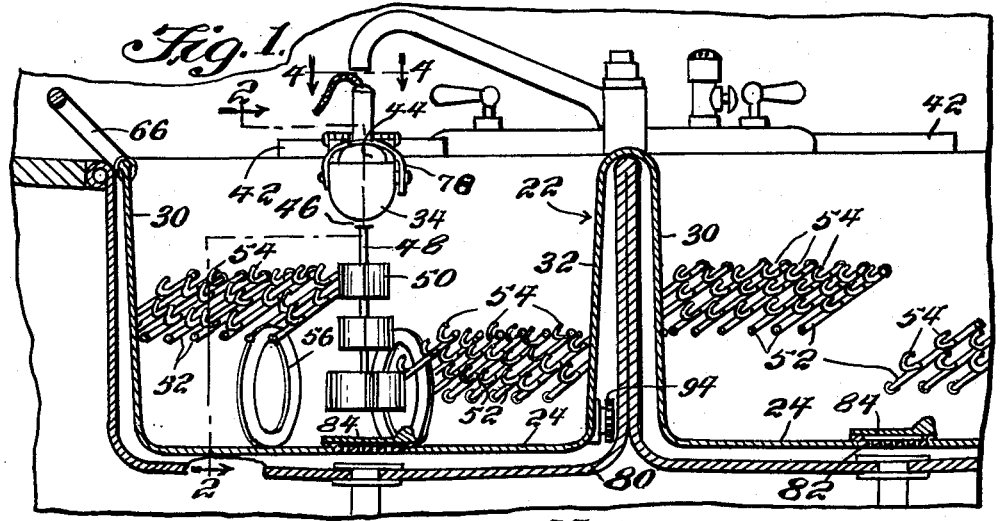
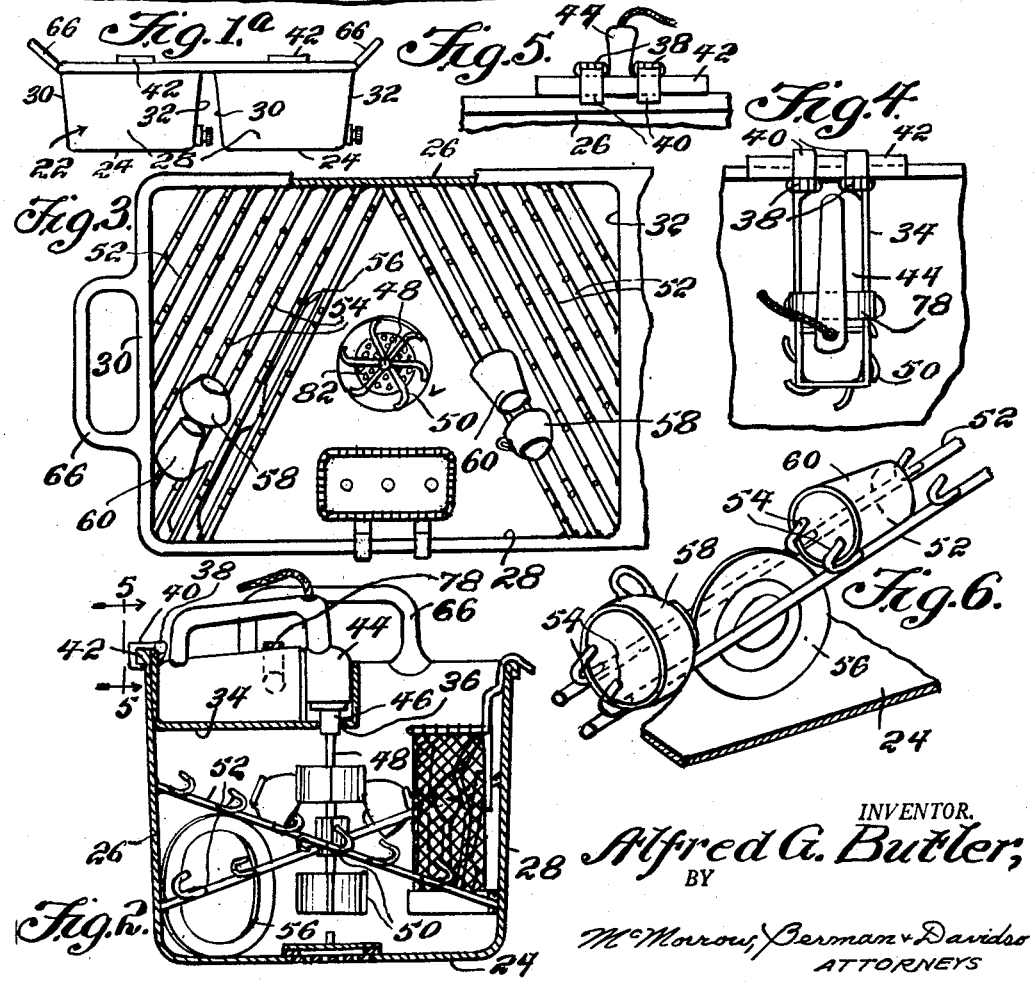
INVENTOR.
Alfred G. Butler;
BY
McMorrow, Berman & Davidson
ATTORNEYS

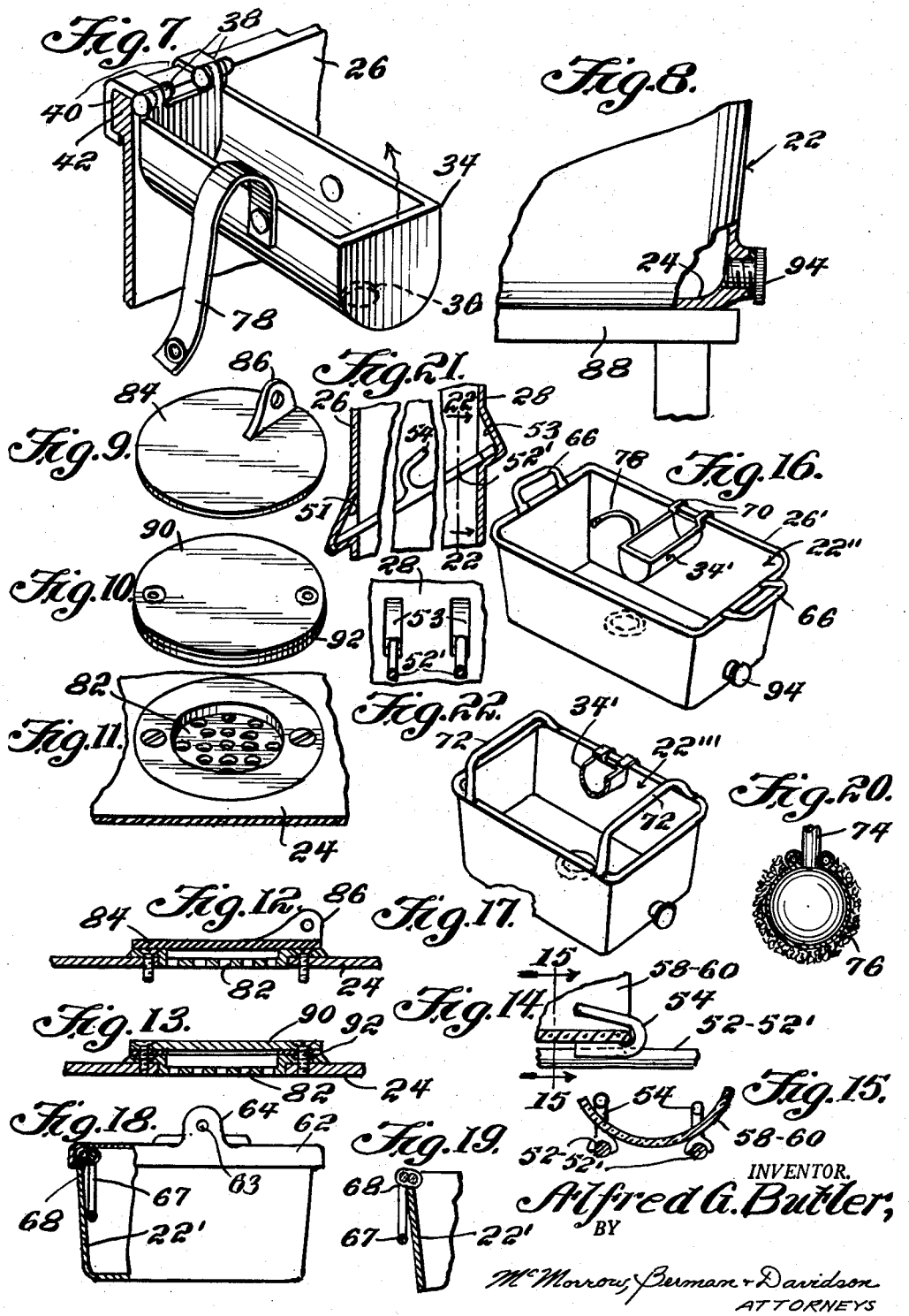

United States Patent Office 2,959,180
Patented Nov. 8, 1960

1

2,959,180
DISHWASHER
Alfred G. Butler, Silverton, Colo.
(1746 Richmond Ave., New York 14, N.Y.)
Filed May 17, 1957, Ser. No. 659,802
4 Claims. (Cl. 134—188)

The present invention relates to a portable dishwasher for installation in a sink.

An object of the present invention is to provide a dishwasher which lends itself to ready portability and installation in a sink, one which may be used apart from any sink, one which lends itself for use with a portable power source means removable from the dishwasher, one which is simple in structure and of sturdy construction, and one which is economical to manufacture and assemble.

These and other objects and advantages of the present invention will be fully apparent from the following description when taken in connection with the annexed drawings, in which:

Figure 1 is a fragmentary sectional view of a double-tub kitchen sink showing the dishwasher of the present invention installed therein;

Figure 1a is an elevational view on a reduced scale of the assembly shown in Figure 1;

Figure 2 is a sectional view taken on the line 2—2 of Figure 1;

Figure 3 is a top plan view with parts broken away;

Figure 4 is a top plan view, as seen on line 4—4 of Figure 1;

Figure 5 is a fragmentary elevational view, as seen on line 5—5 of Figure 2;

Figure 6 is an isometric view of a portion of the dish holding means;

Figure 7 is an isometric view of the motor support means;

Figure 8 is a fragmentary elevational view partially in section showing the means for draining the receptacle when not used with a sink;

Figure 9 is an isometric view of the closure member used in the bottom of the receptacle shown in Figures 1 to 3, inclusive when the receptacle is used in a sink;

Figure 10 is an isometric view of the closure member used to close the drain in the bottom of the receptacle when the receptacle is used apart from any sink;

Figure 11 is an isometric view of the drain in the bottom of the receptacle;

Figure 12 is a sectional view, showing the use of the closure member shown in Figure 9;

Figure 13 is a sectional view showing the use of the closure member shown in Figure 10;

Figure 14 is a fragmentary elevational view showing one of the rack rods and associated hook with a portion of a cup or glass in section supported therein;

Figure 15 is a sectional view taken on the line 15—15 of Figure 14;

Figure 16 is an isometric view of another embodiment of the receptacle of the dishwasher, omitting the motor and dish-supporting rack;

Figure 17 is still another embodiment of the dishwasher according to the present invention, omitting the same components as in Figure 16;

Figure 18 is an elevational view partially in section showing a modification of the handle used with the receptacle of the present invention, with a cover installed over the receptacle;

Figure 19 is a fragmentary sectional view of the assembly shown in Figure 18 with the handle exteriorly of the receptacle;

Figure 20 is a sectional view of a food mixer blade modified for use with the dishwasher according to the present invention;

Figure 21 is a sectional view of the means for supporting the rods 52' in the receptacle side walls 26 and 28; and Figure 22 is a sectional view taken on line 22—22 of Figure 21.

Referring in greater detail to the drawings in which like numerals designate like parts throughout the several views, the dishwasher according to the present invention comprises a receptacle designated generally by the reference numeral 22 and having a bottom 24 and spaced side walls 26 and 28 and spaced end walls 30 and 32 rising from the perimeter of the bottom 24.

While the structure of the dishwasher shown in Figures 1 to 5, inclusive, is a double structure, having two compartments with one compartment used for washing the dishes and the other compartment used for drying the dishes, the second compartment may be eliminated and the structure modified, as seen in Figures 16, 17, and 18, with the identical components within the respective receptacles used and omitting the second compartment and altering of the handles.

The dishwasher according to the present invention provides a horizontally disposed trough 34 having a hole 36 (Fig. 7) inwardly of one end of the trough 34. The trough 34 is positioned within the receptacle 22 adjacent the upper end of the latter with the hole 36 lying along the vertical axis of the receptacle 22. The other end of the trough 34 remote from the hole 36 is connected, as shown in Figure 7, by a pair of hinge elements 38 to substantially U-shaped brackets 40 which extend over and engage the bead 42 on the upper edge of the receptacle 22. Specifically, the trough 34 is attached to the side wall 26 at a point intermediate the end walls 30 and 32. The pivotal connection of the trough 34 to the side wall 26 permits the movement of the trough 34 from the horizontal position to a more or less vertical position in which the trough 34 is above the open top of the receptacle 22.

Portable power means is provided having a vertically disposed drive coupling at one end thereof. This means consists in a food mixer motor 44 having a drive coupling 46 normally receiving the stem of a mixer blade, the latter not being shown as not being a part of the present invention.

The food mixer motor 44 is positioned within the trough 34 with the coupling 46 projecting through the hole 36 and a water agitating means is drivingly connected to the coupling 46. This water agitating means may take the form of a vertically extending rod 48 having paddle assemblies 50 thereon and arranged so that they occupy intermediate spaces on the rod 48.

Rack means is provided disposed between the rod 48 and the receptacle's end walls 30 and 32 and each rack means is adapted to support thereon dishes to be washed. Each of the rack means embodies a plurality of upwardly sloping rods 52 arranged in parallel spaced relation and having their complemental one ends detachably secured in notches 51 in the side wall 26, as shown in Figure 21. Rods 52 on one side of the vertical axis of the receptacle 22 slope upwardly from the side wall 26 and the rods 52 on the other side of the axis slope downwardly from the side wall 26. The rods 52 project at an angle from the side wall 26 so that most of them have their other ends detachably secured in other notches (not shown) in the adjacent portions of the adjacent one of the end walls 30 and 32, but certain rods 52' extend across the receptacle 22 so that their other ends are received in notches 53 (Fig. 21) in the adjacent portions of the side wall 28.

A plurality of upwardly directed hooks 54 are arranged in spaced relation along each of the rods 52, 52' and are secured to the upper sides of the rods 52, 52'. As shown in Figure 6, dishes 56 may be supported between adjacent rods 52, 52' and cups 58 or glasses 60 may be supported upon the rods 52 with their rims engaged in the associated hooks 54.

A cover 62 having a recess 64 therein may be used to cover the open upper end of the receptacle 22', as shown in Figure 18, with the recess covering the motor. The cover 62 is also provided with a hole 63 for extension of a cable therethrough. In this embodiment of the invention, the rigid handle 66, as shown in Figures 1 to 3, inclusive, is omitted and a pivotally connected handle 67 is installed with a link 68 connecting the handle 67 to the end walls of the receptacle 22 for pivotal movement from a position exteriorly of the receptacle 22' to a position within the receptacle 22'. This permits the enclosing of the upper open end of the receptacle 22' by the cover 62.

In Figure 16, a modified form of the invention is shown in which the trough 34' is provided with hanger members 70 at one end thereof for dependingly carrying the trough 34 on the upper edge of the receptacle side wall 26'. The handles used with the receptacle 22'', shown in Figure 16, are rigid and project outwardly at an angle from the upper end of the end walls of the receptacle 22''.

In Figure 17, the same demountable trough 34' is used but the handles 72 extend over the receptacle 22''' adjacent each of the end walls thereof and have their ends secured to the adjacent portion of the side walls of the receptacle 22'''.

In Figure 20, a conventional food mixer beater, designated by the reference numeral 74, is covered with a porous mesh material such as a hollow steel wool bag 76 and may be used with the drive coupling 46 of the motor 44 for the purpose of introducing soap to the dish water used with the associated receptacle.

In use, the motor 44 is secured within the trough 34, 34', by means of a flexible strap element 78 having one end fixed to the trough 34, 34' and having the other end attachable to the trough 34, 34'. With the motor 44 within the trough 34, 34', the rod 48 is inserted within the drive coupling 46 and an appropriate amount of water is introduced into the associated receptacle. The amount of water introduced should be such as to barely cover the dishes placed in the rack means. The motor 44 is then operated at a speed to cause the water to flow over the dishes supported on the rack means and into the cups or glasses supported on the hooks 54, with the agitator rotating at a speed to impel the water against the dishes and glasses with just sufficient force to loosen and separate the food particles adhering thereto. It is to be noted that the speed of the agitator is insufficient to splash water into the trough 34 and thence into the motor 44.

If the dishwasher according to the present invention is installed within a sink, designated by the reference numeral 80 in Figure 1, the drain 82 in the bottom 24 (Fig. 11) is covered by a flexible closure member such as a rubber disc 84 having on its upper face an eye formation 86 for attachment of a chain (not shown) by which the closure member or disc 84 may be removed from its engagement over the top of the drain 82 when it is desired to release water from the dishwasher. If the dishwasher is used apart from the sink 80 and supported upon the table 88, as in Figure 8, the drain 82 is closed by a rigid closure member 90 having a rubber gasket 92 on its underface for sealing the rim of the drain 82. When so used, the dishwasher is emptied of its used dish water by means of a drain plug 94 in one end wall.

It will be seen, therefore, that the dishwasher according to the present invention, in each of its modified forms, provides a readily portable dishwasher having a removable power source preferably in the form of a food mixer motor and the drive coupling thereof. The dishwasher according to the present invention may be used within a sink in which it is readily drained into the drain of the sink when it is desired to release the dish water therefrom or the dishwasher may be supported upon a table independently of any sink and drained into a proper receptacle when desired.

It is an important feature of the present invention that the upwardly sloping rods 52, 52' permit the placing of the dishes and cups so that the impact of the water as caused by the rotation of the paddle assemblies 50 is effective in removing food particles and grease from the interior of the glasses and cups and dishes supported upon the rack means provided by the rods 52, 52' and the hooks 54.

Due to the placement of the rods 52 at each end of the receptacle, one set of rods 52 may be used when only a few dishes are to be washed and both sets of rods 52 used when there are more dishes to be washed. The amount of water to be used will be found by experimentation with a given number of dishes to be cleaned.

What is claimed is:

1. A dishwasher comprising a receptacle having an open top, a bottom, and spaced side and end walls rising from the perimeter of said bottom, a horizontally disposed trough having a hole in the bottom thereof inwardly of one end and positioned within said receptacle adjacent the upper end of the latter with the hole lying along the vertical axis of said receptacle, said trough having the other end connected to one of said side walls for movement of said trough from the horizontal position to a vertical position in which said trough is above the open top of said receptacle, portable power means embodying a food mixer motor having a vertically disposed drive coupling at one end thereof positioned in said trough so that the drive coupling extends through said hole in said trough bottom, water agitating means including a vertically disposed rod and a plurality of spaced paddle assemblies on said rod, said rod being drivingly connected to said drive coupling, rack means disposed between said water agitating means and each of said receptacle end walls and adapted to support thereon dishes to be washed, and a cover removably extending over the open top of said receptacle.

2. A dishwasher comprising a receptacle having an open top, a bottom, and spaced side and end walls rising from the perimeter of said bottom, a horizontally disposed trough having a hole in the bottom thereof inwardly of one end and positioned within said receptacle adjacent the upper end of the latter with the hole lying along the vertical axis of said receptacle, said trough having the other end connected to one of said side walls for movement of said trough from the horizontal position to a vertical position in which said trough is above the open top of said receptacle, portable power means embodying a food mixer motor having a vertically disposed drive coupling at one end thereof positioned in said trough so that said drive coupling extends through said hole in said trough bottom, water agitating means including a vertically disposed rod and a plurality of spaced paddle assemblies on said rod, said rod being drivingly connected to said drive coupling, and rack means disposed between said water agitating means and each of said receptacle end walls and adapted to support thereon dishes to be washed, each of said rack means embodying a plurality of upwardly sloping rods arranged in parallel spaced relation and having their complemental one ends detachably secured to said one receptacle side wall and having their other complemental ends detachably secured to the adjacent portion of the adjacent end wall and the other of said side walls.

3. A dishwasher comprising a receptacle having an open top, a bottom, and spaced side and end walls rising from the perimeter of said bottom, a horizontally disposed trough having a hole in the bottom thereof inwardly of one end and positioned within said receptacle adjacent the upper end of the latter with the hole lying along the vertical axis of said receptacle, said trough having the other end connected to one of said side walls for movement of said trough from the horizontal position to a vertical position in which said trough is above the open top of said receptacle, portable power means embodying a food mixer motor having a vertically disposed drive coupling at one end thereof positioned in said trough so that said drive coupling extends through said hole in said trough bottom, water agitating means including a vertically disposed rod and a plurality of spaced paddle assemblies on said rod, said rod being drivingly connected to said drive coupling, and rack means disposed between said water agitating means and each of said receptacle end walls and adapted to support thereon dishes to be washed, each of said rack means embodying a plurality of upwardly sloping rods arranged in parallel spaced relation and having their complemental one ends detachably secured to said one receptacle side wall and having their other complemental ends detachably secured to the adjacent portion of the adjacent end wall and the other of said side walls, said rods on one side of said water agitating means sloping upwardly from said one side wall and on the other side of said water agitating means sloping downwardly from said one side wall.

4. A dishwasher comprising a receptacle having an open top, a bottom, and spaced side and end walls rising from the perimeter of said bottom, a horizontally disposed trough having a hole in the bottom thereof inwardly of one end and positioned within said receptacle adjacent the upper end of the latter with the hole lying along the vertical axis of said receptacle, said receptacle having the other end connected to one of said side walls for movement of said trough from the horizontal position to a vertical position in which said trough is above the open top of said receptacle, portable power means embodying a food mixer motor having a vertically disposed drive coupling at one end thereof positioned in said trough so that said drive coupling extends through said hole in said trough bottom, water agitating means including a vertically disposed rod and a plurality of spaced paddle assemblies on said rod, said rod being drivingly connected to said drive coupling, rack means disposed between said water agitating means and each of said receptacle end walls and adapted to support thereon dishes to be washed, each of said rack means embodying a plurality of upwardly sloping rods arranged in parallel spaced relation and having their complemental one ends detachably secured to said one receptacle side wall and having their other complemental ends detachably secured to the adjacent portion of the adjacent end wall and the other of said side walls, and a plurality of upwardly directed hooks arranged in spaced relation along each of said rods and secured to said rod.

References Cited in the file of this patent

UNITED STATES PATENTS

| Number | Name | Date |
|---|---|---|
| 894,938 | Brockman | Aug. 4, 1908 |
| 1,266,245 | Fuhrman | May 14, 1918 |
| 1,518,216 | Onody | Dec. 9, 1924 |
| 1,551,884 | James et al. | Sept. 1, 1925 |
| 1,927,943 | Long | Sept. 26, 1933 |
| 2,060,277 | Butts | Nov. 10, 1936 |
| 2,414,971 | Moser | Jan. 28, 1947 |
| 2,629,498 | Marasigan | Feb. 24, 1953 |
| 2,632,568 | Abt | Mar. 24, 1953 |
| 2,652,844 | Van Hise | Sept. 22, 1953 |